United States Patent Office 3,520,402
Patented July 14, 1970

3,520,402
PURIFIED COLLAGEN FIBRILS
Joseph Nichols, Princeton, and Irving B. Oneson, Somerville, N.J., assignors to Ethicon, Inc., a corporation of New Jersey
No Drawing. Filed Aug. 30, 1967, Ser. No. 664,293
Int. Cl. B65h 55/100
U.S. Cl. 206—59                                     8 Claims

ABSTRACT OF THE DISCLOSURE

Collagen is treated sequentially with an enzyme, an alkaline borohydride, and a one percent salt solution to remove impurities. The collagen fibrils so obtained are swollen in acid solution and may be centrifuged or filtered to remove insoluble impurities.

---

The present invention relates to a method of preparing highly purified collagen fibrils and more specifically to purified collagen that is substantially free of antigenic substances.

Collagen has been used for many years by surgeons when a material was needed that combined the properties of high tensile strength and absorbability in living tissue. Thus absorbable sutures, ligatures, and other prosthetic devices, such as, sponges, films, and tubes, have been prepared from collagen and used with good results. Much attention has been devoted to the purification of collagen as it is associated in nature with other substances that may cause irritation, inflammation, or produce an antigenic response in the human body. The large number of patents that have issued in this area is evidence of the research effort that has been applied to this problem. A method of removing impurities from animal intestines to produce a superior catgut suture is described in U.S. Pat. No. 2,750,251.

A more sophisticated process for the manufacture of collagen strands from bovine tendon is described in U.S. Pats. No. 3,114,372 and No. 3,114,593. In this process, tendon slices are swollen in an acid solution to form a dispersion of collagen fibrils that is extruded through a spinnerette into a coagulating bath. The collagen monofilaments so obtained contain far fewer impurities than does catgut as indicated by the following analysis:

TABLE I.—COMPARATIVE COLLAGEN PURITY

|  | Extruded tape [1] (per cent) | Catgut (sheep submucosa) |
|---|---|---|
| Hexose [4] | .34 | .62 |
| Uronic Acid [5] | .08 | .03 |
| Glucosamine [6] | .054 | .026 |
| Galactosamine [6] | .036 | .005 |
| Cysteic acid [6] | Trace | Trace |
| Autoclaved residue [2] | .33 | 2.8 |
| T.C.A. residue [3] | 1.95 | 4.0 |

[1] Tape was prepared by the method described in Example X of U.S. Patent No. 3,114,372.
[2] Percent insoluble residue recovered by centrifugation when one gram sample is autoclaved twice with 100 ml. of water at 15 p.s.i. (120° C.) for 4 hours.
[3] Percent insoluble residue recovered when a two gram sample is heated for 30 minutes at 90° C. with 80 ml. of 0.15 molar trichloroacetic acid, centrifuged, heated for 15 minutes with 40 ml. of 0.15 molar trichloroacetic acid, and centrifuged a second time.
[4] The percent hexose is determined by the anthrone method, using glucose as a standard. This method is described by Trevelyan and Harrison, Biochem. Jour., vol. 50, page 298 (1952).
[5] Uronic acid is determined by Dische's carbazol method: Z. Dische in Methods of Biochemical Analysis (ed. Glick), 2, 313 (1955).
[6] Glucosamine and Galactosamine are determined on the Beckman Amino Acid Analyzer, Model 120 B, using 4 normal HCl hydrolysis for 16 hours. Cysteic acid is also determined on the Amino Acid Analyzer.

The association of the impurities identified above with collagen as it occurs in its native state is such that the separation and removal of these impurities without alteration of the morphological structure and identity of the collagen fibril has long defied solution.

While the present invention is not to be limited by any particular theory, it is believed that the antigenicity associated with collagen, from which soluble components have been removed, is mainly (if not entirely) due to the presence of structural glycoproteins linked to the insoluble fibrous stromae of connective tissue. As such structural glycoproteins are insoluble in 0.15 molar trichloroacetic acid at 90° C., the trichloroacetic acid insoluble residue is believed to be a measure of the antigenicity associated with collagen.

It is an object of the present invention to prepare a dispersion of collagen fibrils that is substantially free of impurities insoluble in 0.15 molar trichloroacetic acid at 90° C.

It is another object of this invention to separate and remove from collagen fibrils the impurities associated therewith without dissolving the collagen fibril and without altering the physical or chemical properties of the collagen fibril.

Yet another object of this invention is to provide commercial quantities of exceptionally pure pure collagen fibrils that may be used in the manufacture of surgical products of reduced antigenicity.

In accordance with the present invention, highly-purified collagen fibrils are economically produced in commercial quantities. Such collagen fibrils are useful in the manufacture of superior surgical sutures, sponges, films, tubes, and other prosthetic devices. In accordance with the present invention, finely-divided (sliced) collagen is treated sequentially with an enzyme, a borohydride, and an aqueous salt solution to remove soluble impurities. The collagen particles are then swollen in an acid solution to form a dispersion of swollen collagen fibrils, and the solution is either filtered and/or centrifuged to remove insoluble impurities. The order in which the enzyme and borohydride react with the collagen is not critical. The salt solution is more effective, however, after the collagen has been treated with ficin or a borohydride to separate the individual collagen fibrils. Preferably, the removal of soluble impurities should precede the acid swelling step as treating the collagen with an enzyme or borohydride tends to aid the separation of the individual collagen fibrils. Moreover, many enzymes will attack collagen under acid conditions, and the borohydride treatment is most effective as an alkaline pH.

The enzymes that have been found useful in the present invention are those which hydrolize elastin, the so-called elastases. Suitable elastases for this step of the present process are described in U.S. Pat. No. 2,973,302, which also teaches the concentration and pH of the enzyme solutions and the time and temperature that will produce the desired reaction without adversely effecting the collagen. Ficin is the enzyme that is preferred for this step, and the preferred reaction conditions are one hour at 37° C. The ficin is then deactivated by treatment with a 0.1 percent $NaClO_2$ solution for one-half hour.

Following the enzyme treatment, the collagen particles are washed well with distilled water and extracted with a one percent aqueous salt solution. Sodium chloride, sodium sulfate, or any similar water salt may be used. Ammonium nitrate is the preferred salt because of the ease with which it can be removed by washing. The concentration of the salt solution should be greater than 0.5 percent although there is little advantage in increasing the salt concentration beyond one percent, as washing the collagen salt free will be more difficult.

Following the salt extraction step, the collagen fibrils are again washed and then treated with an alkaline borohydride solution. Suitable borohydrides for use in the present invention are the alkali metal borohydrides, such as, sodium borohydride and potassium borohydride. Tetramethyl ammonium borohydride may also be used. These compounds are dissolved in water to produce an aqueous solution containing from 0.5 percent to 5.2 percent by weight of the active reagent (0.13 to 1.5 molar). The collagen fibrils are then immersed in the alkali metal borohydride solution for three to eighteen hours. The temperature of the alkali metal borohydride solution may vary from 7° C. to 36° C. The fact that this process is not critically sensitive to temperature is an important advantage as it is unnecessary to install plant equipment to maintain the water temperature constant.

The borohydride solution is drained off, and the fibrils are treated with a brief wash of one percent $NH_4NO_3$. The fibrils are again washed with distilled water, incubated at room temperature for one hour with one percent $NH_4NO_3$, drained, and washed again with distilled water. Insoluble impurities may next be removed by swelling the collagen fibrils overnight in a dilute aqueous acid solution and filtering (to remove particles larger than the collagen fibrils) or centrifuging. Centrifugation will remove particles more dense than the collagen fibril.

The filtered dispersion of acid-swollen collagen fibrils may be precipitated by neutralizing or by adding sufficient 67 percent $NH_4NO_3$ to bring the concentration of $$NH_4NO_3$$

in the total solution to four percent. The deswollen fibrils are collected by stirring, drained on a cheesecloth, neutralized with ammonia, and washed with water. The purified collagen fibrils may now be used to produce a collagen dispersion in the manner described in the aforementioned Pat. No. 3,114,372. Such dispersions spin well to produce an extremely pure quality of collagen tape.

It will be recognized that some of the steps described have been used before to produce purified collagen fibrils. However, the completely unexpected and unpredictable result of the process as a whole is that a combination of all of the steps described above is needed to produce highly purified collagen fibrils. This is best illustrated by Table II, "Evaluation of Purification Steps." The heading "Filter Screens" indicates the use of metal screens having openings no larger than 5.5 mils to give the collagen dispersions a filtration just before the deaerating step. When the De Laval centrifugation step is used, filtration probably contributes only to the homogenization of the dispersion and not to the removal of impurities. The heading "De Laval Centrifugation" includes the centrifugation and filtration of the dilute dispersion through coarse, sintered glass.

distilled water, and extracted for one hour with 1,600 parts of an aqueous one percent $NH_4NO_3$ solution containing .08 percent sodium chlorite The fibrils are now washed five times with distilled water and incubated at room temperature with 1,600 parts of 0.25 molar $NaBH_4$ for three hours. After draining off the borohydride, the fibrils are neutralized with a brief wash of an aqueous one percent $NH_4NO_3$ solution. The fibrils are washed five times with distilled water, incubated for one hour with 1,600 parts of a one percent aqueous $NH_4NO_3$ solution, and washed again with distilled water.

The washed fibrils are swollen overnight in 2,000 parts of cold 0.3 percent acetic acid. The next day, the swollen mass is homogenized in the Waring Blendor with sufficient cold 0.3 percent acetic acid to arrive at a final concentration of 0.1 percent collagen. The dilute dispersion is filtered first through one layer of cheesecloth and then through two layers of cheesecloth. The partially-clarified dispersion is centrifuged twice through the De Laval gyrotest unit using the bowl-type centrifuge.

The centrifuged dispersion is finally filtered through sintered glass using extra coarse, followed by coarse, sintered glass filters.

The filtered dispersion is now precipitated by adding 67 percent $NH_4NO_3$ solution (filtered through coarse, sintered glass) until the final concentration of $NH_4NO_3$ is 4 percent. The deswollen fibrils are collected by stirring and drained on cheesecloth. After neutralization with ammonia, the fibrillar mass is washed five times with distilled water.

The purified fibrils are recovered in 85–90 percent yield based on dry tendon solids and may be used to produce a collagen dispersion as described in U.S. Pat. No. 2,920,000. Such dispersions spin well to produce good quality tape, which can be converted into tanned sutures of low antigenicity by the procedure described in U.S. Pat. No. 3,114,372.

The quality of the tape produced by this process is shown in Table III, "Comparative Collagen Purity," which compares a collagen tape prepared by the method of U.S. Pat. No. 3,322,125, Example X, with a tape of extruded collagen fibrils purified in accordance with the present example.

TABLE II.—EVALUATION OF PURIFICATION STEPS [1]

| Filter screens | Delaval centrifugation | $NH_4NO_3$ extraction | Ficin incubation | $NaBH_4$ incubation | Uronic acid | Autoclaved residue | TCA residue [2] |
|---|---|---|---|---|---|---|---|
| 0 | 0 | 0 | 0 | 0 | .64 | 1.60 | 6.75 |
| 0 | 0 | 0 | X | 0 | .43 | 1.00 | 3.25 |
| X | 0 | 0 | X | 0 | .31 | -------- | 2.37 |
| X | 0 | X | X | 0 | .08 | .33 | 1.95 |
| X | 0 | 0 | X | X | .04 | .02 | .64 |
| 0 | 0 | X | X | X | .02 | .22 | .63 |
| X | 0 | X | X | X | .02 | .07 | .46 |
| X | X | X | 0 | X | .02 | .15 | .45 |
| X | X | X | X | 0 | .03 | .39 | .43 |
| X | X | X | X | X | .01 | .09 | .07 |

[1] The collagen source material is steer tendon (branches of the deep flexor tendon).
[2] Percent insoluble residue recovered when a two gram sample is heated for 30 minutes at 90° C. with 80 ml. of 0.15 molar trichloroacetic acid, centrifuged, heated for 15 minutes with 40 ml. of 0.15 molar trichloroacetic acid, and centrifuged a second time.

In the following patent examples, all quantities are expressed in parts by weight unless otherwise indicated.

EXAMPLE I

One hundred and sixty parts by weight of bovine tendon slices are treated for one hour at 37° C. with 1,600 parts of .08 percent crude ficin dispersed in .05 molar phosphate buffer at pH 6.0. The ficin is clarified by filtering through Celite just prior to use. After incubation, the slices are filtered in cheesecloth, washed five times with

TABLE III.—COMPARATIVE COLLAGEN PURITY IN EXTRUDED TAPE

| | U.S. Patent No. 3,114,372 Example X, percent | Example I, percent |
|---|---|---|
| Hexose | .34 | .25 |
| Uronic acid | .08 | .01 |
| Glucosamine | .054 | .005 |
| Galactosamine | .036 | .009 |
| Cysteic acid | Trace | 0 |
| Autoclaved residue [2] | .33 | .09 |
| T.C.A. residue [3] | 1.95 | .07 |

[2,3] See Table I for footnotes.

Table IV gives the amino acid analysis of the pure collagen tape of the present example (Example I), and Table V gives the amino acid analysis of the .07 percent trichloroacetic acid residue derived from this tape (Example I).

EXAMPLE II

Bovine tendon (branches of the deep flexor tendon), containing a large percentage of material that does not swell in acid solution, is sliced to a thickness of 10 to 25 mils. To 100 parts of a 0.5 molar solution of sodium borohydride maintained at a temperature of 36° C. is added 2.231 parts of the tendon slices (dry weight 0.740 part). The tendon slices are contained in a stainless steel basket that is immersed in the borohydride solution without agitation for 18 hours. The pH of this sodium borohydride solution is 10.4. After 18 hours, the sodium borohydride solution is drained off, and the tendon slices are washed three times with agitation in 100 parts of water.

The washed slices are then immersed in 100 parts of a one percent ammonium nitrate solution and incubated for one hour at room temperature. The ammonium nitrate solution is drained off, and the collagen is washed five times with distilled water.

The collagen is next treated for 16 hours at 37° C. with 10 parts by volume of 0.02 percent crude ficin dispersed in 1 percent $NH_4NO_3$ at pH 6.0. The ficin is clarified by filtration just prior to use. After incubation, the collagen is filtered in cheesecloth, washed five times with distilled water, and extracted for one hour with one percent ammonium nitrate solution. The collagen is washed five times with 10 parts by volume of distilled water and is swollen overnight in cold 0.3 percent (v./v.) acetic acid. The next day the swollen mass is homogenized with sufficient cold 0.3 precent (v./v.) acetic acid to arrive at a final concentration of 0.1 percent collagen. The dilute dispersion is filtered first through a 5.5 mil screen and then through a 1 mil screen. The partially-clarified dispersion is centrifuged twice through the De Laval gyro-test centrifuge using the bowl-type centrifuge.

TABLE IV.—COLLAGEN TAPE OF EXAMPLE I

| Amino acid: | Residues per thousand |
|---|---|
| Glucosamine | Trace |
| Galactosamine | |
| Hydroxylysine | 7.28 |
| Lysine | 19.40 |
| Histidine | 6.06 |
| Ammonia | 48.30 |
| Arginine | 48.70 |
| 3-hypro | 1.08 |
| Hydroxyproline | 87.50 |
| Aspartic acid | 41.60 |
| Threonine | 14.50 |
| Serine | 28.10 |
| Glutamic acid | 68.40 |
| Proline | 112.00 |
| Glycine | 330.00 |
| Alanine | 109.00 |
| Valine | 19.60 |
| Cystine | |
| Methionine | 5.57 |
| Isoleucine | 10.40 |
| Leucine | 23.20 |
| Tyrosine | 3.32 |
| Phenylalanine | 12.30 |
| Cysteic acid | |
| Percent nitrogen | 17.50 |

TABLE V.—TRICHLOROACETIC ACID RESIDUE

| Amino acid: | Residues per thousand |
|---|---|
| Glucosamine | 6.53 |
| Galactosamine | 4.92 |
| Hydroxylysine | 2.01 |
| Lysine | 38.60 |
| Histidine | 18.30 |

TABLE V.—Continued

| Amino acid: | Residues per thousand |
|---|---|
| Ammonia | 102.00 |
| Arginine | 46.30 |
| 3-hypro | Trace |
| Hydroxyproline | 12.40 |
| Aspartic acid | 79.90 |
| Threonine | 30.90 |
| Serine | 56.40 |
| Glutamic acid | 81.40 |
| Proline | 61.80 |
| Glycine | 123.00 |
| Alanine | 74.40 |
| Valine | 50.20 |
| Cystine (half) | 15.00 |
| Methionine | 13.30 |
| Isoleucine | 36.30 |
| Leucine | 87.00 |
| Tyrosine | 26.70 |
| Phenylalanine | 32.50 |
| Cysteic acid | 0.75 |
| Percent nitrogen | 8.87 |

The centrifuge dispersion is finely filtered through an extra coarse, sintered glass filtered followed by filtration through a coarse, sintered glass filter.

The filtered dispersion is now precipitated by adding enough 67 percent ammonium nitrate solution (filtered through coarse, sintered glass) to bring the total concentration of ammonium nitrate in solution to 4 percent. The deswollen collagen fibrils are collected by stirring and drained on cheesecloth, After neutralization with ammonia, the fibrillar mass is washed five times with distilled water. The collagen fibrils recovered have the analysis indicated in Table VI.

TABLE VI.—COMPARATIVE COLLAGEN PURITY

| | U.S. Patent No. 3,114,372 Example X, percent | Example II, percent |
|---|---|---|
| Hexose | .34 | .19 |
| Uronic acid | .08 | .02 |
| Glucosamine | .054 | .004 |
| Galactosamine | .036 | <.004 |
| Cysteic acid | Trace | |
| Autoclaved residue [2] | .33 | .06 |
| T.C.A. residue [3] | 1.95 | .07 |

[2,3] See Table I for footnotes.

EXAMPLE III

A steer hide is immersed in 3.5 percent (weight/volume) acetic acid for 96 hours at 68–72° F. The hair and epidermis are scraped off, and the corium is neutralized with $NaHCO_3$ and washed well with tap water. After shredding to one-inch strips, the hide is frozen and sliced to 16 mil sections in an automatic meat slicer.

The slices are treated as described in Example I above. It is necessary to centrifuge the dispersion seven times through the De Laval gyro-test unit to remove particles that interfere with filtration. The supernatant is then filtered through sintered glass. The collagen fibrils recovered have the analysis indicated in Table VII.

TABLE VII.—PURITY OF STEER HIDE FIBRILS

| | Percent |
|---|---|
| Hexose | .33 |
| Uronic acid | .02 |
| Glucosamine | .005 |
| Galactosamine | <.004 |
| Autoclaved residue [1] | .05 |
| T.C.A. residue [2] | .05 |

[1] See footnote 2 under Table I.
[2] See footnote 3 under Table I.

We claim:

1. Purified collagen fibrils having associated therewith no more than 0.45 percent hexose, 0.03 percent uronic acid, 0.01 percent glucosamine, and 0.01 percent galactosamine, and characterized by a solubility in 0.15 molar trichloroacetic acid at 90° C. of at least 99.9 percent.

2. A collagenous article comprising extruded monofilament consisting essentially of collagen fibrils having throughout their entire length, in the monofilament as in their natural state, typical banding at intervals of approximately 640 angstrom units and rectilinearity; substantially all of said fibrils having an alignment parallel to the longitudinal axis of the monofilament which contains them; said collagen fibrils having associated therewith no more than 0.45 percent hexose, 0.03 percent uronic acid, 0.01 percent glucosamine, and 0.01 percent galactosamine, and characterized by a solubility in 0.15 molar trichloroacetic acid at 90° C. of at least 99.9 percent.

3. A collagenous article comprising a multiplicity of monofilaments consisting essentially of collagen fibrils having throughout their entire length, in the monofilaments as in their natural state, typical banding at intervals of approximately 640 angstrom units and rectilinearity; substantially all of said fibrils having an alignment parallel to the longitudinal axis of the monofilament which contains them; said monofilaments being bonded to each other along their longitudinal surfaces to form a unitary linear structure, and disposed in parallel contiguity with respect to each other; and said unitary structure having a longitudinal axis in substantial parallelism with the longitudinal axis of the various monofilaments therein; said collagen fibrils having associated therewith no more than 0.45 percent hexose, 0.03 percent uronic acid, 0.01 percent glucosamine, and 0.01 percent galactosamine, and characterized by a solubility in 0.15 molar trichloroacetic acid at 90° C. of at least 99.9 percent.

4. A collagenous article according to claim 3, which is circular in cross section.

5. An article of manufacture according to claim 3, wherein each monofilament is bonded to each monofilament contiguous thereto throughout the entire extent of their contiguity.

6. A collagenous article including a multiplicity of monofilaments disposed in the form of a tape having substantially greater width than thickness and comprising collagen fibrils having throughout their entire length, in the monofilaments as in their natural state, typical banding at intervals of approximately 640 angstrom units and rectilinearity; substantially all of said fibrils having an alignment parallel to the longitudinal axis of the monofilament which contains them; said monofilaments being bonded to each other along their longitudinal surfaces to form a unitary linear structure, and disposed in parallel contiguity with respect to each other; and said unitary structure having a longitudinal axis in substantial parallelism with the longitudinal axis of the various monofilaments therein; said collagen fibrils having associated therewith no more than 0.45 percent hexose, 0.03 percent uronic acid, 0.01 percent glucosamine, and 0.01 percent galactosamine, and characterized by a solubility in 0.15 molar trichloroacetic acid at 90° C. of at least 99.9 percent.

7. An article of manufacture according to claim 6, wherein the tape is convoluted about its longitudinal axis with each convolution bonded with adjacent convolutions.

8. A collagenous article according to claim 6, wherein the tape is of uniform width and thickness with substantially greater width than thickness and having opposed principal faces with substantially the same spacing throughout the extent of their areas; said tape being convoluted about its longitudinal axis with each convolution bonded with its adjacent convolutions; said tape being impregnated with a collagen tanning agent substantially uniformly throughout its length and to a degree depending upon distance from the nearer of said principal faces; whereby the tanning throughout the collagenous article is substantially uniform.

References Cited

UNITED STATES PATENTS 3,114,372   12/1963   Griset et al. _____ 161—402

MORRIS SUSSMAN, Primary Examiner

U.S. Cl. X.R.

8—94.11; 99—176; 128—296, 335.5; 161—143